United States Patent
Miyata et al.

[11] Patent Number: 6,161,752
[45] Date of Patent: Dec. 19, 2000

[54] PLATE WIDTH CENTER ALIGNMENT METHOD AND APPARATUS FOR WELDING MACHINE

[75] Inventors: Junji Miyata; Keiji Sodeno; Masayuki Nakamura; Seiji Kodama; Nobuyoshi Nakatani; Masaru Takeshita, all of Tokyo, Japan

[73] Assignees: Mitsubishi Denki Kabushiki Kaisha; Mitsubishi Electric Engineering Co., Ltd., both of Tokyo, Japan

[21] Appl. No.: 09/313,077

[22] Filed: May 17, 1999

[30] Foreign Application Priority Data

Nov. 19, 1998 [JP] Japan .................................. 10-329453

[51] Int. Cl.⁷ .............................. B23K 1/00; B23K 5/00
[52] U.S. Cl. ............................................................ 228/160
[58] Field of Search .............................. 228/160, 5.1, 9, 228/14

[56] References Cited

U.S. PATENT DOCUMENTS

| | | | |
|---|---|---|---|
| 3,746,238 | 7/1973 | Sprague | 228/9 |
| 3,816,695 | 6/1974 | Deffenbaugh | 219/100 |
| 4,121,084 | 10/1978 | Wear | 219/91.2 |
| 4,234,777 | 11/1980 | Balfanxz | 219/125.1 |
| 4,255,643 | 3/1981 | Balfanz | 219/124.34 |
| 4,280,039 | 7/1981 | Campbell et al. | 219/78.11 |
| 4,380,695 | 4/1983 | Nelson | 219/125.12 |

FOREIGN PATENT DOCUMENTS 61-132269 6/1986 Japan .
363278678A 11/1988 Japan .

*Primary Examiner*—Patrick Ryan
*Assistant Examiner*—Zidia T. Pittman
*Attorney, Agent, or Firm*—Sughrue, Mion, Zinn, Macpeak & Seas, PLLC

[57] ABSTRACT

An object of the present invention is to provide plate width center alignment method and apparatus for a welding machine, which can dispense with a detection driving device, which is simple in construction but can perform the detection from a position closest to a cutting-welding position, and which is high in plate width center alignment accuracy. Plate side edge detectors which are included in a plate width center alignment means for detecting plate widths of two cut plates and aligning plate width centers with each other, and which detect widthwise plate side edges of the two cut plates, are disposed on a movable frame provided with a cutting means and a welding means, elongated in the width direction of a web and movable in that direction.

8 Claims, 9 Drawing Sheets

(1) DISPOSE MOVABLE FRAME ON LINE CENTER CL (2) MOVE MOVABLE FRAME TOWARD OPERATION SIDE UNTIL PLATE EDGE IS DETECTED (3) MOVE MOVABLE FRAME TOWARD NON-OPERATION SIDE UNTIL PLATE EDGE IS DETECTED

PLATE WIDTH CENTER ALIGNMENT METHOD AND APPARATUS FOR WELDING MACHINE

BACKGROUND OF THE INVENTION

1. Field of the Invention

The present invention relates to a welding machine having a movable frame that is equipped with a cutting means for cutting a plate to be welded (hereafter, a plate to be welded is referred to as a web, when applicable) in a width direction, and a welding means for welding cut portions of two cut plates obtained from the web, and that is elongated in the width direction of the web, so that the cutting and welding are performed while the movable frame is moved in the width direction of the web. In particular, the present invention relates to a plate width center alignment method and a plate width center alignment apparatus each for aligning plate width centers of the two cut plates with each other prior to the welding, which is employed by or included in a welding machine for welding cut portions of the two cut plates (obtained by cutting the web) to each other while overlapping or abutting the two cut plates to each other.

2. Description of the Related Art

FIG. 10 is a schematic view showing a plate width center alignment apparatus for a welding machine, which is disclosed in Japanese Patent Application Laid-open No. Sho 61-132269. Reference numeral 2 in FIG. 10 designates an anterior plate which is cut off from a web (a plate to be welded) consecutively supplied, and reference numeral 3 designates a posterior plate left as the web at the supply side. Reference numeral 55 designates a clamp of a positioning means 68 for clamping the anterior plate 2 to move the same, and reference numeral 66 designates a clamp of a positioning means 68 for clamping the posterior plate 3 to move the same.

This positioning means 68 is controlled by a not-shown control means. That is, the positioning means 68 is driven on the basis of correction values which are obtained by the control means through arithmetic processing on detected values sent from four plate side edge detectors (four optical plate side edge detectors 51a, 51b, 51c and 51d in this example) disposed independently to detect respective plate width ends, i.e. plate side edges, of the anterior and posterior plates 2 and 3.

The optical plate side edge detectors 51a, 51b, 51c and 51d mentioned above require a detection driving means for driving these detectors to detect the subjects to be detected, i.e. the plate side edges. In this example, the detection driving means is constructed by pulse encoders 54a and 54b, pinions 53a and 53b, support members 52a and 52b elongated from the pinions to support the plate side edge detectors 51a, 51b, 51c and 51d, and so on.

FIG. 11 shows a principle of the arithmetic processing for obtaining a deviation amount between the plate width central lines, which is executed by the controller. By detecting the positions of the respective plate side edges of the anterior and posterior plates 2 and 3, the control means performs the arithmetic processing to obtain distances A, B, C and D from the plate side edges to imaginary lines L1 and L2 parallel to plate width center lines used as references, and calculate a deviation amount θ between the plate width centers of the anterior and posterior plates 2 and 3, on the basis of which the plate width centers of the plates 2 and 3 are aligned to each other by the clamps 55 and 66 of the positioning means 68.

The conventional apparatus requires the detection driving means for driving the plate side edge detectors 51a, 51b, 51c and 51d for detection as described above. The installation of the detection driving means onto the welding machine makes the entire welding machine complicated and bulky, and the maintenance work difficult.

It is ideal that the plate side edges are detected from positions close to a cutting-welding position, i.e. an actual welding position, but the plate side edge detectors having the detection driving means occupy a large area to make it difficult to secure the installation space. Under this circumstance, the detection of the plate side edges must be carried out from a position far away from the cutting-welding position. The detection of the plate side edges from the far-away position encounters problems in that the detection is unreliable, for instance, in a case where the plate to be welded, i.e. the anterior plate or the posterior plate, is warped, to make is difficult to accurately align the plate width centers, and that the detection motion of the plate side edge detectors and thus drive control for the detection driving means is required independently in the sequence of the welding machine to elongate the entire operation time of the welding machine.

SUMMARY OF THE INVENTION

In view of the problems encountered in the conventional apparatus, an object of the present invention is to provide plate width center alignment method and apparatus, which can dispense with a detection driving means, which is simple in construction but can perform the detection from a position closest to a cutting-welding position, and which is high in plate width center alignment accuracy.

In a welding machine having a movable frame that is equipped with a cutting means for cutting a web in a width direction, and a welding means for welding cut portions of two cut plates thus obtained from the web, and that is elongated in the width direction of the web, so that the cutting and welding are performed while the movable frame is moved in the width direction, a plate width center alignment apparatus for the welding machine according to the present invention is characterized by comprising:

plate side edge detectors which are included in a plate width center alignment means for detecting plate width of the two cut plates and aligning plate width centers with each other, which detect widthwise plate side edges of the two cut plates, and which are disposed on the movable frame.

In a welding machine having a movable frame that is equipped with a cutting means for cutting a web in a width direction, and a welding means for welding cut portions of two cut plates thus obtained from the web, and that is elongated in the width direction of the web, so that the cutting and welding are performed while the movable frame is moved in the width direction, a plate width center alignment apparatus for the welding machine according to the present invention is characterized by comprising:

plate side edge detectors which are included in a plate width center alignment means for detecting plate width of the two cut plates and aligning plate width centers with each other, which detect widthwise plate side edges of the two cut plates, and which are disposed on the cutting means supported by the movable frame and elongated in the width direction of the web.

The plate width center alignment apparatus for the welding machine according to the present invention is characterized in that at least two or more plate side edge detectors for detecting a maximum width and a minimum width of the two cut plates are disposed on the movable frame to detect the widthwise plate side edges of the cut plates.

The plate width center alignment apparatus for the welding machine according to the present invention is characterized in that at least two or more plate side edge detectors for detecting a maximum width and a minimum width of the two cut plates are disposed on the cutting means supported by the movable frame and elongated in the width direction of the web to detect the widthwise plate side edges of the cut plates.

The plate width center alignment apparatus for the welding machine according to the present invention is characterized in that each of the plate side edge detectors is provided with swinging means for swinging each of the plate side edge detectors to detect a corresponding one of the widthwise plate side edges of the webs.

The plate width center alignment apparatus for the welding machine according to the present invention is characterized in that the plate side edge detectors are constructed by optical sensors arranged in parallel to detect the plate side edges in association with the motion of the movable frame.

The plate width center alignment apparatus for the welding machine according to the present invention is characterized in that the plate side edge detectors are independently disposed to detect the widthwise plate side edges of the plates to be welded, respectively, and a moving means is provided, which mounts the plate side edge detectors thereon, and is disposed on both sides in the width direction of the web to be movable in the width direction of the web.

A plate width center alignment method according to the present invention is used in the plate width center alignment apparatus for the welding machine. The welding machine has a movable frame that is equipped with a cutting means for cutting a web in a width direction, and a welding means for welding cut portions of two cut plates thus obtained from the web, and that is elongated in the width direction of the web, so that the cutting and welding are performed while the movable frame is moved in the width direction. The plate width center alignment apparatus for the welding machine includes plate side edge detectors which are included in a plate width center alignment means for detecting plate width of the two cut plates and aligning plate width centers with each other, which detect widthwise plate side edges of the two cut plates, and which are disposed on the movable frame or the cutting means supported by the movable frame and elongated in the width direction of the web. The method according to the present invention is characterized by comprising the steps of:

detecting the plate widths of the two cut plates by moving the movable frame after the web is cut and before the two cut plates are welded to each other; and aligning the centers of the plate widths of the two cut plates with each other based on the detection result.

DETAILED DESCRIPTION OF THE PREFERRED EMBODIMENTS

Embodiment 1

Figure 1:
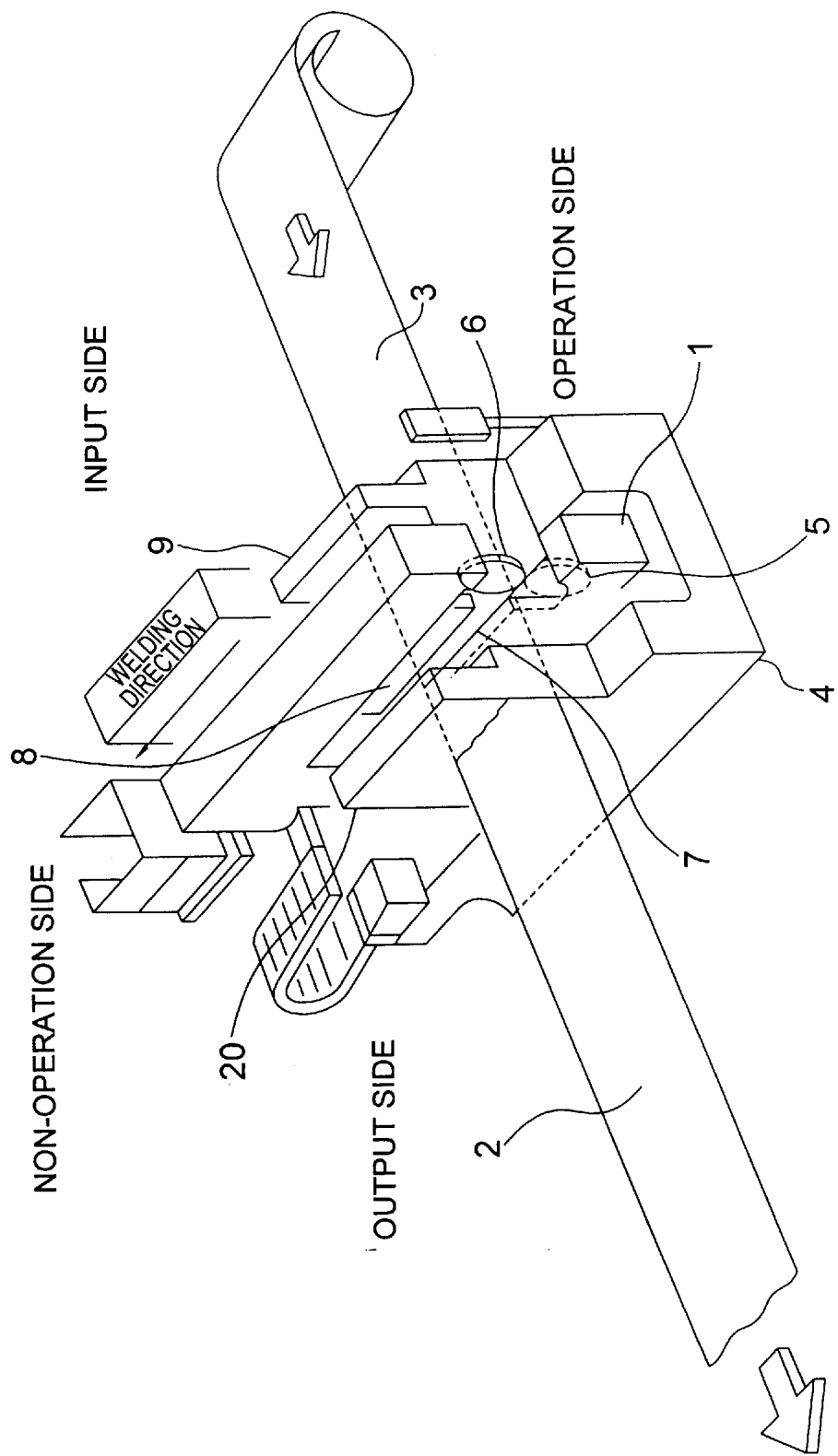
FIG. 1 is a perspective view of an apparatus according to a first embodiment of the present invention.
Figure 2:
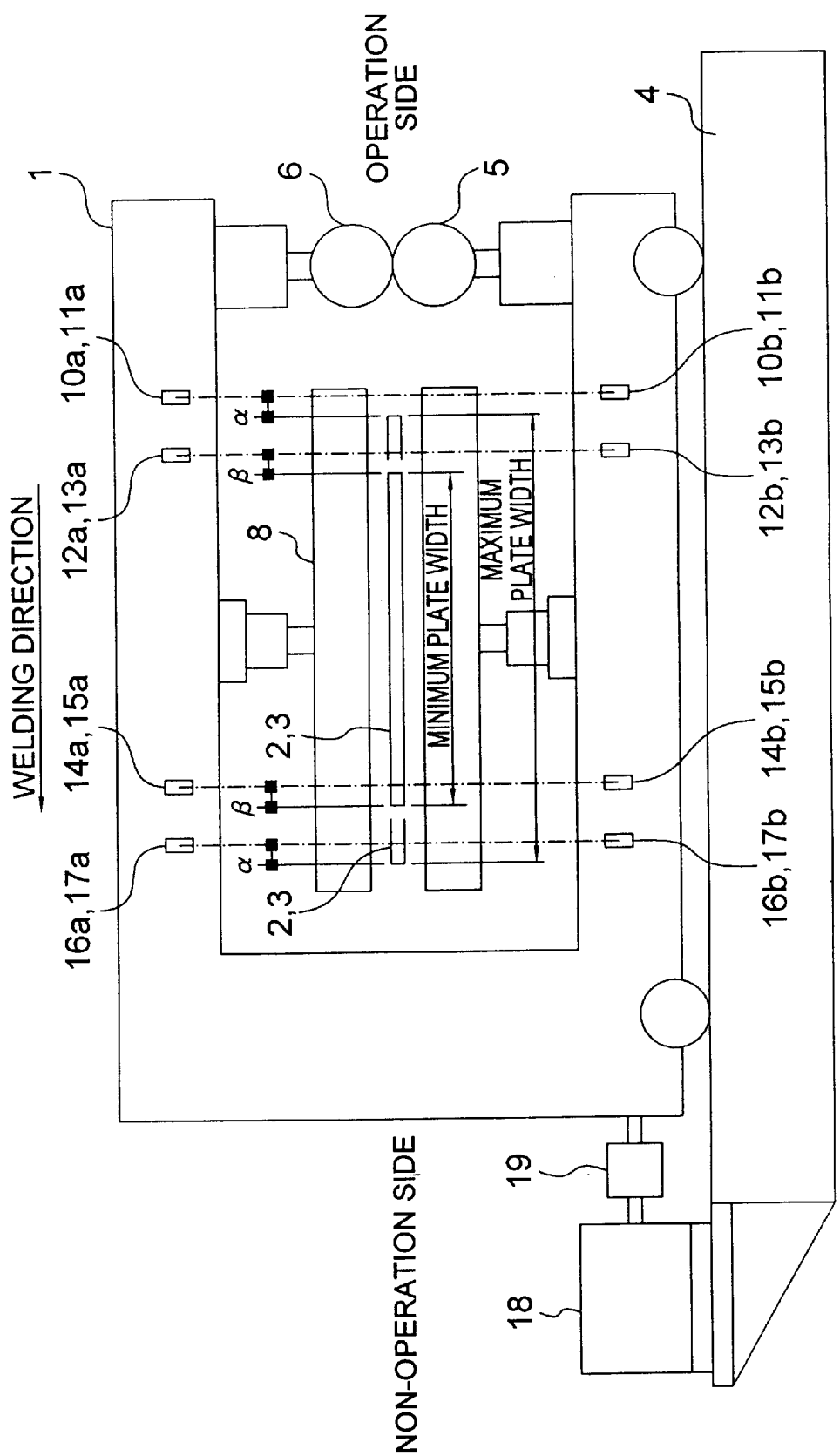
FIG. 2 is an elevational view of an apparatus according to the first embodiment of the present invention.

In an welding machine shown in FIGS. 1 and 2, a plate to be welded (a plate to be welded is referred to as a web, when applicable) is gradually unwound from its rolled state to be consecutively supplied to a cutting-welding position. The welding machine is provided with a movable frame 1 having a cutting means and a welding means so that the cutting and welding are performed while the movable frame 1 is moved in the width direction of the web. The cutting means is designed to cut the web in the width direction so that an anterior plate 2 (i.e. one of cut plates) is cut off from the web, whereas a posterior plate 3 (i.e. the other of the cut plates) is left as the web. The welding means is designed to weld cut portions of the two cut plates thus obtained with the cut portions overlapped with each other or abutted against each other. The welding machine is further provided with plate side edge detectors of a plate width center alignment means for respectively detecting plate widths of two cut plates 2 and 3 which have been cut off and aligning plate width centers of the two cut plates 2 and 3 with each other. The plate side edge detectors are disposed on the movable frame 1 so as to detect the plate side edges of the two cut plates 2 and 3 using the motion or travel of the movable frame 1.

In FIGS. 1 and 2, the movable frame 1 is U-shaped, and disposed in such a manner that the web supplied are located horizontally in a central portion of a space defined within the U-shaped movable frame 1. The movable frame 1 is movable on and along a common base 4 in the width direction of the web. Reference numeral 18 in FIG. 2 designate a travel driving means for the movable frame 1, and reference numeral 19 designates a position detecting encoder for detecting the position of the movable frame 1.

As the cutting means for the web located in the central portion of the space defined by the U-shaped movable frame 1, there are installed an upper cutting device 8 on the upper edge side of the space defined by the U-shaped movable frame 1, and a lower cutting means 7 on the lower edge side thereof. As the welding means, there are installed an upper electrode 6 on the upper edge side of the opening of the space defined by the U-shaped movable frame 1, and a lower electrode 5 on the lower edge side thereof.

The anterior plate 2 and the posterior plate 3 are clamped and held by an input side (supply side) clamp 9 and an output side clamp 20 as the positioning means, and then the movable frame 1 is moved so that the trailing edge of the anterior plate 2 and the leading edge of the posterior plate 3 are simultaneously cut off from each other by the lower cutting device 7 and the upper cutting device 8 as the cutting means. Thereafter, the plate width centers are made coincident with each other, the cut portions of the anterior and posterior plates 2 and 3 are appropriately overlapped with each other or abutted against each other, and then the movable frame 1 is again moved so that the welding is carried out on the anterior and posterior plates 2 and 3 (i.e. plates to be welded) in the direction perpendicular to the supply direction of the web (i.e. in the widthwise direction of the anterior plate 2 and the posterior plate 3) using lower electrode 5 and the upper electrode 6 as the welding means.

The input side clamp 9 and the output side clamp 20, i.e. the positioning means, align the plate width centers of the anterior plate 2 and the posterior plate 3 prior to the welding. In general, the alignment is carried out such that the input side clamp 9 is moved in the direction perpendicular to the plate width center line.

In FIG. 2, the web is supplied to the movable frame 1 in the direction from the back side of the drawing sheet to the surface side thereof. The movable frame 1 is moved from the stationary position shown in FIG. 2 toward the left handed side in the FIG. 2. In the left handed side of the running direction of the movable frame 1 in FIG. 1 (i.e. the surface side of FIG. 2), plate side edge detectors 12a and 12b for detecting one plate side edge of the anterior plate 2 are disposed on the right handed side in FIG. 2 (i.e. the operation side) as well as plate side edge detectors 14a and 14b for detecting the other side edge of the anterior plate 2 are disposed on the left handed side in FIG. 2, so as to cope with the minimum plate width β of the anterior plate 2 (i.e. one of the cut plates). In the right handed side of the running direction of the movable frame 1 in FIG. 1 (i.e. the back side of FIG. 2), plate side edge detectors 13a and 13b for detecting one plate side edge of the posterior plate 3 are disposed on the right handed side in FIG. 2 (i.e. the operation side) as well as plate side edge detectors 15a and 15b for detecting the other side edge of the posterior plate 3 are disposed on the left handed side in FIG. 2, so as to cope with the minimum plate width β of the posterior plate 3 (i.e. the other of the cut plates).

In the left handed side of the running direction of the movable frame 1 in FIG. 1 (i.e. the surface side of FIG. 2), plate side edge detectors 10a and 10b for detecting one plate side edge of the anterior plate 2 are disposed on the right handed side in FIG. 2 (i.e. the operation side) as well as plate side edge detectors 16a and 16b for detecting the other side edge of the anterior plate 2 are disposed on the left handed side in FIG. 2 (i.e. the non-operation side), so as to cope with the maximum plate width α of the anterior plate 2 (i.e. one of the cut plates). In the right handed side of the running direction of the movable frame 1 in FIG. 1 (i.e. the back side of FIG. 2), plate side edge detectors 11a and 11b for detecting one plate side edge of the posterior plate 3 are disposed on the right handed side in FIG. 2 (i.e. the operation side) as well as plate side edge detectors 17a and 17b for detecting the other side edge of the posterior plate 3 are disposed on the left handed side in FIG. 2, so as to cope with the maximum plate width α of the posterior plate 3 (i.e. the other of the cut plates).

Each of the plate side edge detectors 10 to 17 in the first embodiment employs a transmission type optical sensor having a light emitting element a and a light receiving element b mutually opposed to each other. To show the opposed positional relationship of these elements, the characters a and b are applied to the same reference numerals. The light emitting element a and the light receiving element b may be disposed reversely.

If a reflection type optical sensor, in place of the transmission type optical sensor, is used as the plate side edge detector, it is unnecessary to dispose the elements constituting the sensor to be opposed to each other as shown in the first embodiment. For example, the reflection type sensor disposed only on any one of the sides can serve as the plate side edge detector. Therefore, hereafter, the explanation for the plate side edge detector constructed by the oppositely disposed light emitting and receiving elements a and b may sometimes be made while omitting the additional characters a and b.

The plate side edge detectors 10 and 11 and the plate side edge detectors 16 and 17 all for the maximum plate width are installed in the operation side so that a distance between the operation side detectors and the non-operation side detectors corresponds the maximum plate width α. Similarly, the plate side edge detectors 12 and 13 and the plate side edge detectors 14 and 15 all for the minimum plate width are installed in the operation side so that a distance between the operation side detectors and the non-operation side detectors corresponds the minimum plate width β.

Next, the operation will be described with reference to FIG. 2. When the overlapping or abutting operation of the anterior plate 2 and the posterior plate 3 are completed subsequent to the cutting in the entire operation of the welding machine, the movable frame 1 starts to travel in the welding direction, i.e. in the direction from the right handed operation side to the left handed non-operation side.

During this travelling motion, to weld the web close to the maximum plate width, the plate side edge detectors 16 and 17 and the plate side edge detectors 10 and 11 detect the plate side edges (in case where a photoelectric tube of an optical sensor is used as each plate side edge detector, the plate side edge can be detected by sensing the change from the light transmission to the light interruption or the light interruption to the light transmission), and concurrently the apparatus reads the values of the encoder 19 connected to the drive motor 18 for the movable frame 1 on which the cutting device is installed, whereby it is possible to obtain absolute positions of the plate side edges of the anterior plate 2 and the posterior plate 3 with respect to the plate width center lines. Since the absolute positions of the plate width centers of the anterior plate 2 and the posterior plate 3 can be obtained as long as the absolute positions of the plate side edges are obtained, a deviation amount between the plate width centers of the anterior plates 2 and the posterior plate 3 can be obtained accordingly.

After the positions of the plate width centers are obtained in this manner, and before the upper electrode 6 and the lower electrode 5, i.e. the welding means, reach the operation side end and start the welding, the plate width center alignment for the anterior plate 2 and the posterior plate 3 can be completed such that each of the anterior plate 2 and posterior plate 3 are moved one half of the deviation amount between the plate width centers of the anterior plate 2 and the posterior plate 3 perpendicular to the plate width center lines through the input side clamp 9 of the positioning means 68 holding the posterior plate 3 or the output side clamp 20 of the positioning means 68 holding the anterior plate 2. Therefore, the anterior plate 2 and the posterior plate 3 can be welded to each other in a state that the plate width centers are accurately coincident with each other.

Although the plate side edge detectors corresponding to the maximum plate width α and the plate side edge detectors corresponding to the minimum plate width β are installed to detect the plate side edges in this embodiment, a plurality of plate side edge detectors corresponding to intermediate plate widths may be installed to attain the same effect.

Embodiment 2

Figure 3:
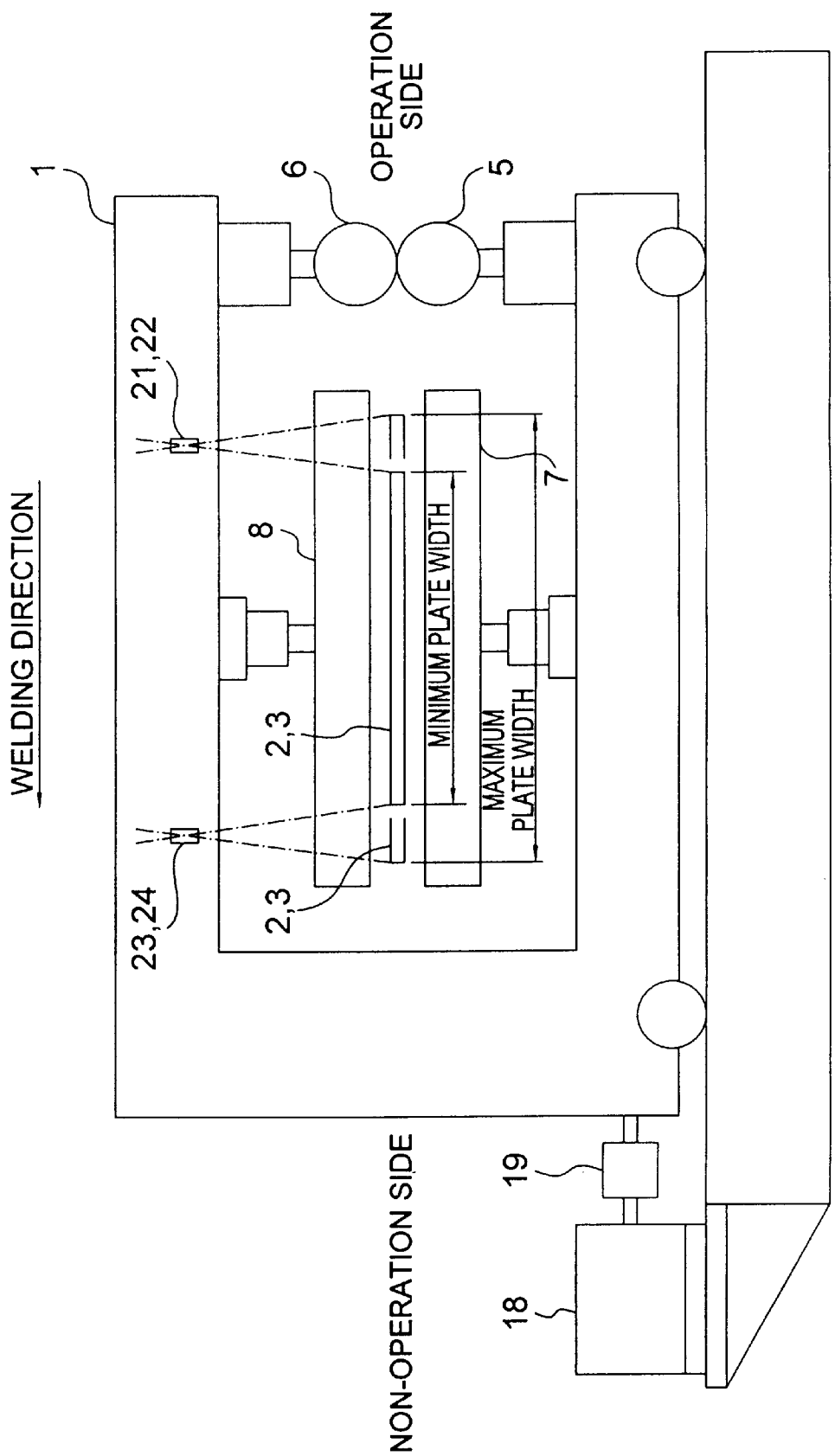
FIG. 3 is an elevational view of an apparatus according to a second embodiment of the present invention.

FIG. 3 shows a second embodiment in which plate side edge detectors 21, 22, 23 and 24, such as reflection type optical sensors, are used in place of the plate side edge detectors 10 to 17 disposed on the movable frame 1 of the welding machine of the first embodiment, and a swinging means is provided for each of the plate side edge detectors 21, 22, 23 and 24 so that the plate side edge detectors 21, 22, 23 and 24 can be swung to detect respective widthwise side edges of the plates to be welded. Note that the same or functionally equivalent parts are denoted by the same reference numerals between the first and second embodiments, and the description thereof is omitted here.

The first embodiment requires total eight plate side edge detectors 10 to 17 since two plate side edge detectors are disposed to detect the maximum plate width α and the minimum plate width β with respect to each of four subjects to be detected (i.e. two widthwise side edges of the anterior plate 2 and two widthwise side edges of the posterior plate 3).

In contrast, in the second embodiment, each of the plate side edge detectors 21, 22, 23 and 24 disposed for detection of respective subjects is provided with the swinging means for swinging the same to detect both the maximum plate width α and the minimum plate width β of the plate side edge (i.e. the subject to be detected), and therefore the required numbers of the plate side edge detectors can be reduced from eight to four (that is, the required numbers of the detectors in the second embodiment is the half of the required numbers of the detectors in the first embodiment).

By swinging the plate side edge detectors 21, 22, 23 and 24 by a certain angle in a direction perpendicular to the elongated direction of the subject plate side edges (for instance, in the case where the reflection type photoelectric tube is used as the plate side edge detector, by obtaining both a timing at which the presence or absence of the reflected light is sensed, and a swing angle at that timing), the absolute positions of the plate side edges can be obtained. By obtaining the absolute positions of the plate side edges of the anterior plate 2 and the posterior plate 3, the plate width center positions of the anterior plate 2 and the posterior plate 3 can be obtained. Therefore, a deviation amount of the anterior plate 2 and the posterior plate 3 can be calculated.

In addition, although this embodiment does not require the motion or travel of the movable frame 1 during the detection, the detection may be carried out by swinging the certain plate side edge detectors while moving the movable frame 1.

The detection operation by these plate side edge detectors 21, 22, 23 and 24 is not associated with the linear reciprocating motion unlike the first embodiment, and is effected by the swinging within a small angle at a stationary position. Therefore, the time period required for the detection operation can be made remarkably short.

The short time period existing after the web is cut and before the welding is started makes it possible to effect the required detection operation, thereby quickly completes the plate width center alignment of the anterior plate 2 and the posterior plate 3 prior to the start of the welding.

Embodiment 3

Figure 4:
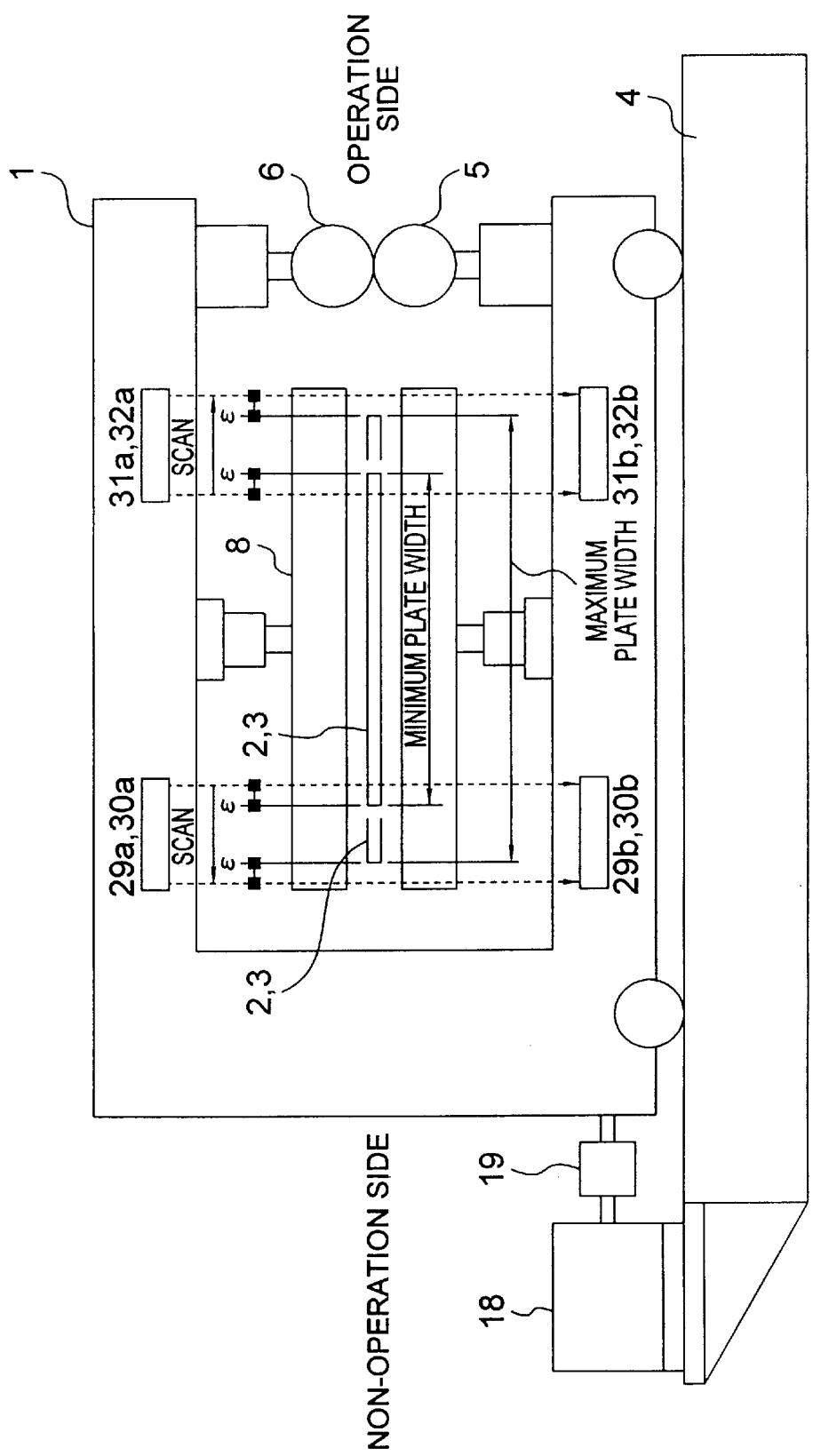
FIG. 4 is an elevational view of an apparatus according to a third embodiment of the present invention.

In the first embodiment, to detect the plate side edges, plate side edge detectors corresponding to the maximum plate width α and the plate side edge detectors corresponding to the minimum plate width β are installed. In the third embodiment, as shown in FIG. 4, each of plate side edge detectors 29a and 29b, plate side edge detectors 30a and 30b, plate side edge detectors 31a and 31b, and plate side edge detectors 32a and 32b are constructed by parallely disposed optical sensors to detect the plate side edges in association with the travel of the movable frame 1. In order to cover the entire maximum plate width by scanning in association with the travel of the movable frame 1, for example, linear type detectors are installed as the plate side edge detectors 29 to 32. Accordingly, the same or similar effect as those of the first and second embodiments can be obtained. In addition, in FIG. 4 the parts the same as or functionally equivalent to those of the first and second embodiments are denoted by the same reference numerals, so that the description thereof is omitted.

Embodiment 4

Figure 5:
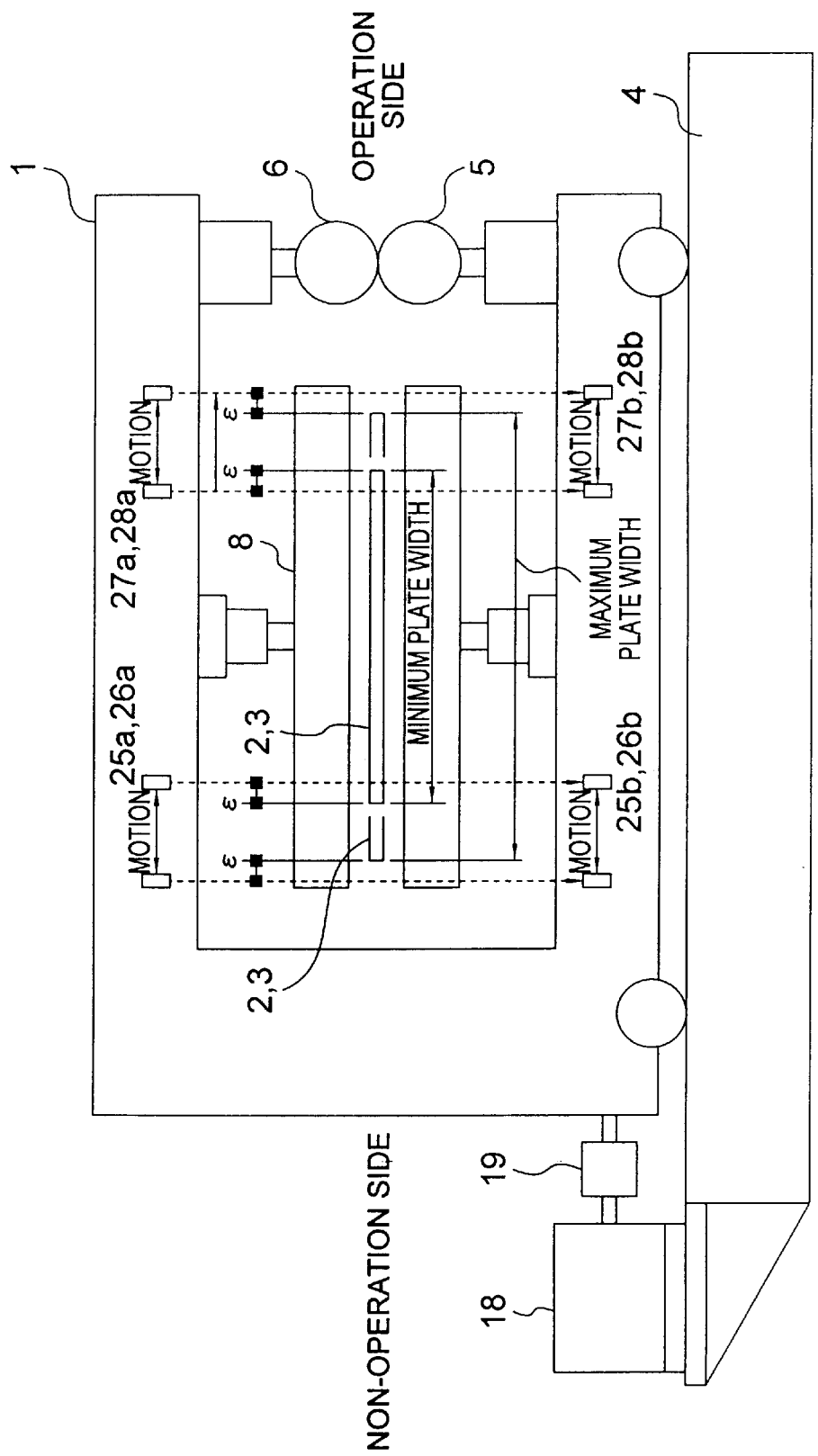
FIG. 5 is an elevational view of an apparatus according to a fourth embodiment of the present invention.
Figure 6:
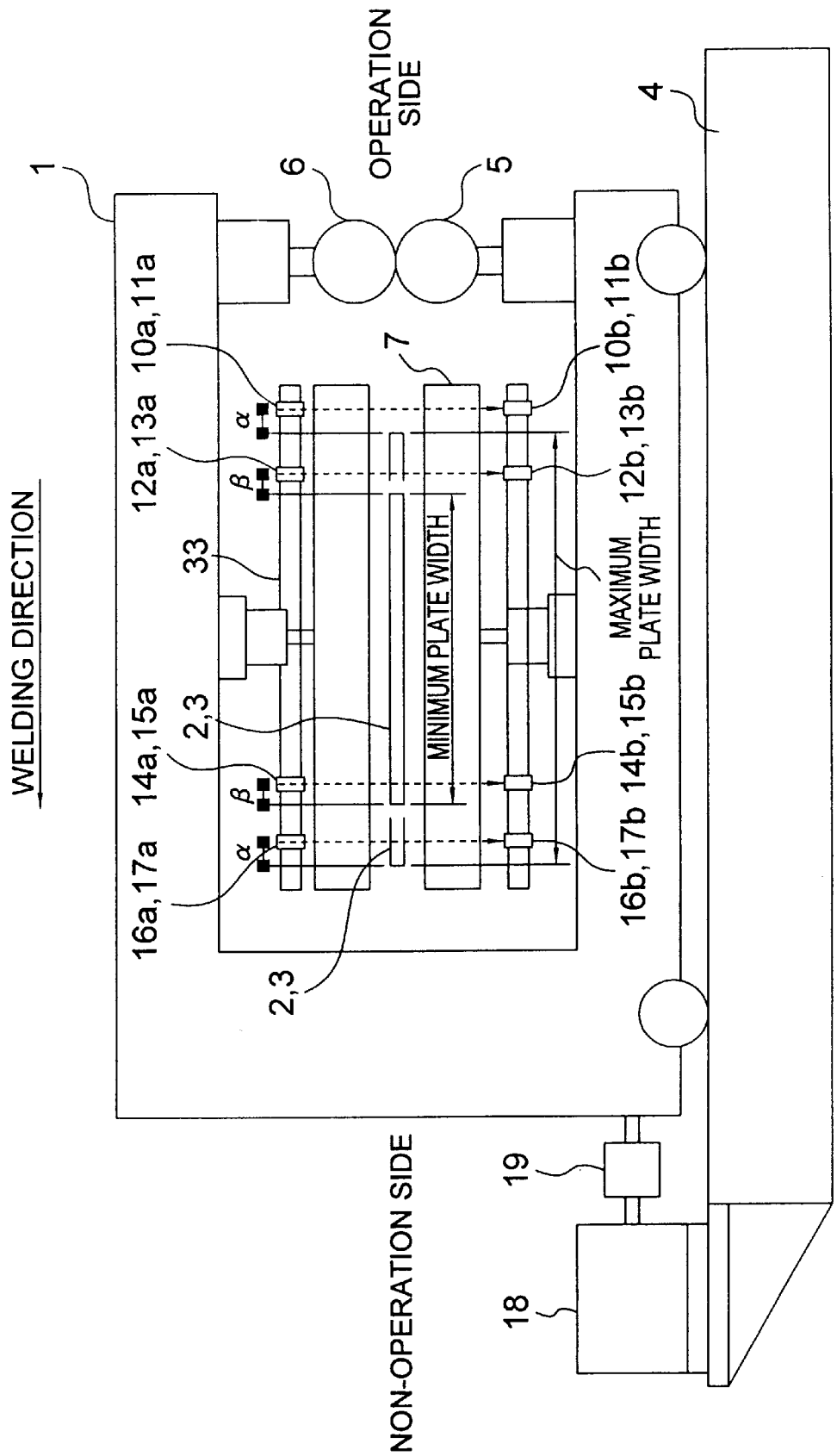
FIG. 6 is an elevational view of an apparatus according to a fifth embodiment of the present invention.

In the fourth embodiment as shown in FIG. 5, at least two or more plate side edge detectors 25a and 25b, plate side edge detectors 27a and 27b, plate side edge detectors 26a and 26b, and plate side edge detectors 28a and 28b are disposed on the movable frame 1 to detect the maximum width and the minimum width of the two cut plates 2 and 3 and detect the widthwise side edges of the cut plates. Namely, the detectors are provided such that one plate side edge detector is disposed per one plate side edge (the subject to be detected) to detect the same. Further, each of the plate side edge detectors thus disposed are arranged to reciprocate a short distance on and along the movable frame 1 in the traveling direction of the frame 1. That is, the same effect as that of the first embodiment is obtained by disposing, for each of the cut plates, two detectors on the operation side and non-operation side, respectively, and causing the one detector to reciprocate on the stationary movable frame 1 to detect the minimum plate width and the maximum plate width with respect to the one plate side edge (the subject to be detected). In addition, the parts the same as or equivalent to those of the first and second embodiments are denoted by the same reference numerals, and the description thereof is omitted.

Embodiment 5

In contrast to the first to fourth embodiments in which the plate side edge detectors are not installed on the upper edge side and the lower edge side of the space defined by U-shaped movable frame 1, the plate side edge detectors are installed on a device support frame 33 of the upper cutting device 8 and a device support frame 34 of the lower cutting device 7 that are the cutting means vertically facing the widths of the plates 2 and 3 to be welded which are located in the central portion of the space defined by the U-shaped movable frame 1.

The device support frame 33 of the upper cutting device 8 and the device support frame 34 of the lower cutting device 7 that serve as the cutting means are elongated in the travelling direction of the movable frame 1, and the detectors are associated with the upper edge and the lower edge of the movable frame 1 through the device support frames 33 and 34, and therefore the motion of the detectors are the same as the motion of the movable frame 1.

Consequently, the arrangement in which the plate edge side detectors installed on the movable frame in the first to fourth embodiments are installed on both of or either of the upper and lower cutting devices 7 and 8 or both of or either of the device support frames 33 and 34 can attain not only the same effect as that of the aforementioned embodiments, but also the high detection accuracy since the subject can be detected at a position closer to the cutting-welding position rather than they are installed on the movable frame 1. In addition, the parts the same as or functionally equivalent to those of the first embodiment are denoted by the same reference numerals, so that the description thereof is omitted.

Embodiment 6

In the first, third and fifth embodiments, the detection operation is effected by moving the movable frame 1 in one-way direction, and followed by plate width center alignment operation. In this sixth embodiment, the movable frame 1 per se does not reciprocate over the entire stroke of the traveling distance. The sixth embodiment relates to a detection method in the plate width center alignment direction, in which, in order to obtain the same effect as that of the aforementioned embodiments, the movable frame 1 is caused to reciprocate partially along the stroke within a range sufficient to detect the plate side edges (i.e. the subject to be detected). The description of this embodiment will be given below with reference to FIGS. 7 to 9. Note that the parts the same as or functionally equivalent to those of the aforementioned embodiments are denoted by the same reference numerals, so that the description thereof is omitted.

Figure 7:
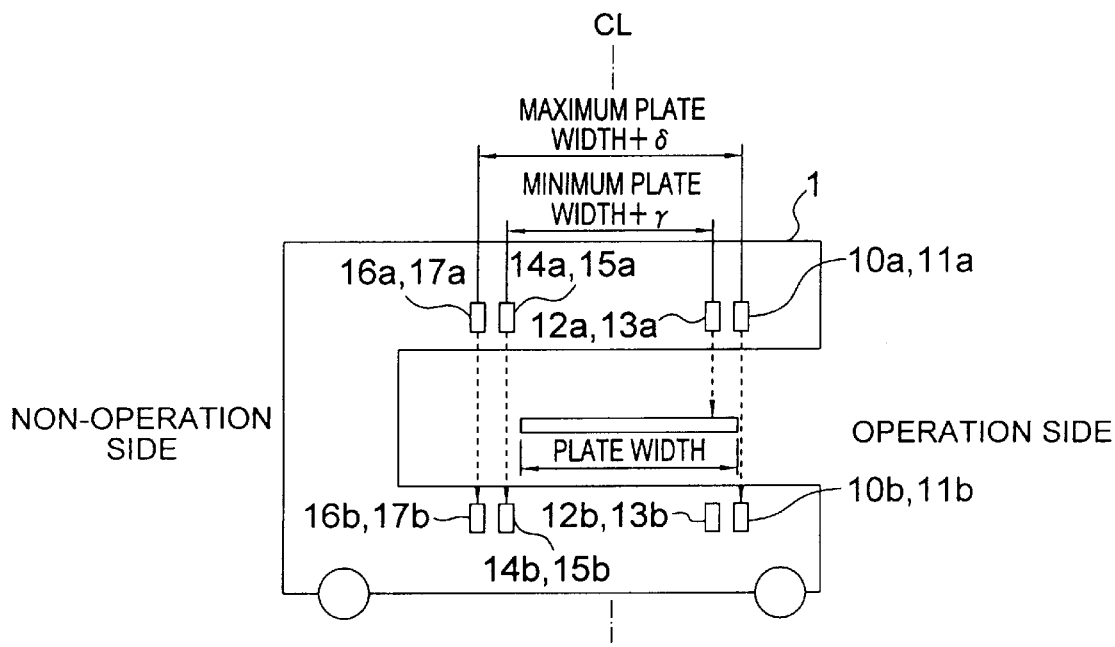
FIG. 7 is an elevational view of an apparatus according to a sixth embodiment of the present invention.

In FIG. 7, as similarly to the first embodiment, plate side edge detectors 10 to 17 are installed on the movable frame 1 so as to detect and scan the positions that are distanced δ from the maximum plate width and distanced γ from the minimum plate width, respectively. These plate side edge detectors are disposed with sufficient predetermined margins so that the cut plates 2 and 3 (i.e. the plates to be welded) are located between the transmission type plate side edge detectors 16, 14 (17, 15) and 12, 10(13, 11) which are distributed to the front side and rear side in the traveling direction of the movable frame 1 (or the left side and the right side of the drawings). The line CL in the drawings denotes a center line of the supplied web in the width direction. In the states of (2) and (3) of the drawings, the cut plate is offset or displaced in the right handed direction in the drawings as a consequence of the cutting.

In general, the position shown in the drawing is set as the stationary position (i.e. the original position) of the movable frame 1, and therefore any motion or travel of the movable frame 1 immediately before the drive operation can be avoided by the initial setting.

Figure 8:
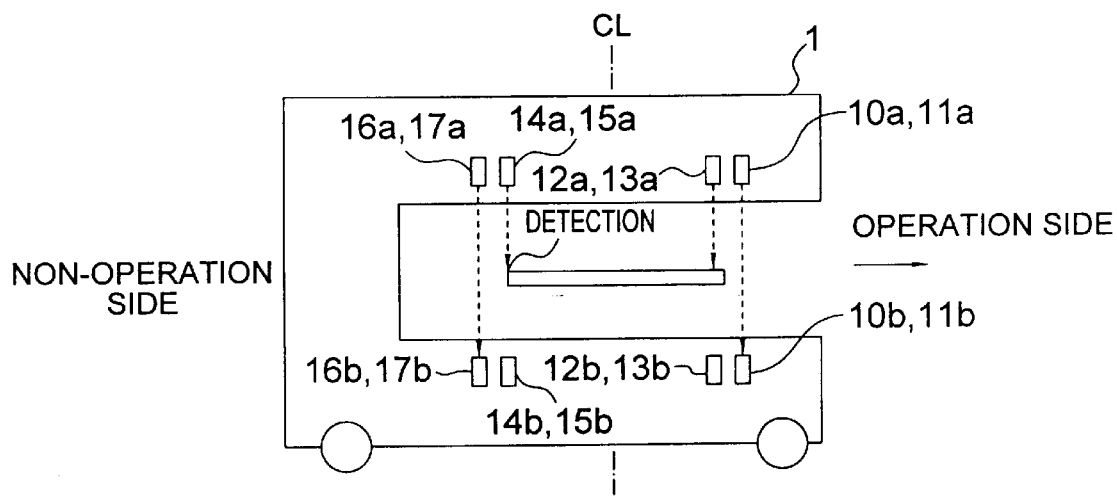
FIG. 8 is an elevational view of the sixth embodiment of the present invention in a state in which the apparatus is moved in the right handed direction in the drawing.

Next, as shown in FIG. 8, the movable frame 1 is moved toward the operation side (i.e. in the right handed direction in the drawing). This motion or travel makes it possible to obtain the absolute positions of the non-operation side plate side edges of the anterior plate 2 and the posterior plate 3 using the non-operation side (left handed side of the drawing) plate side edge detectors 16 and 14 (17 and 15) similarly to the first embodiment. Therefore, the travelling distance or amount in this right handed direction can be suppressed to be such a range as to obtain the absolute positions of the non-operation side plate side edges.

Figure 9:
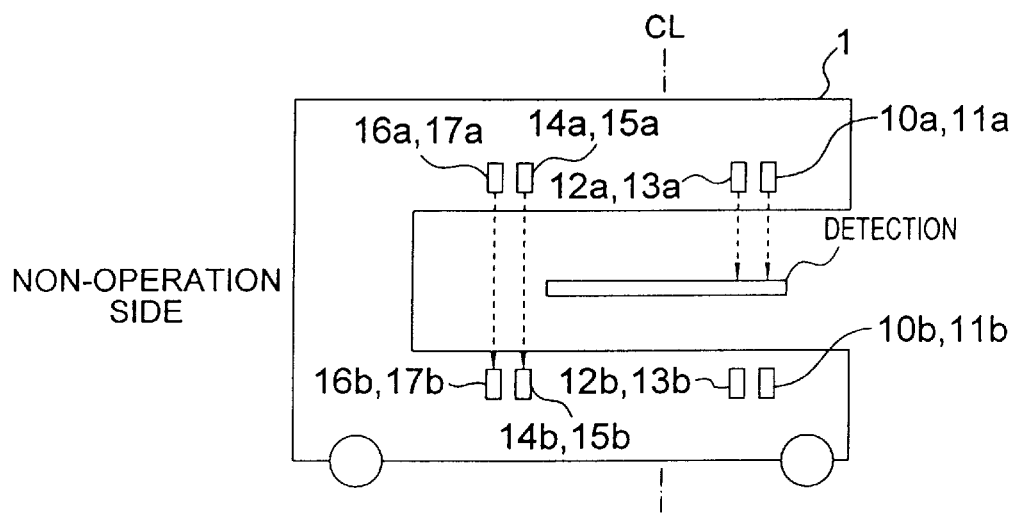
FIG. 9 is an elevational view of the sixth embodiment of the present invention in a state in which the apparatus is moved in the left handed direction.
Figure 10:
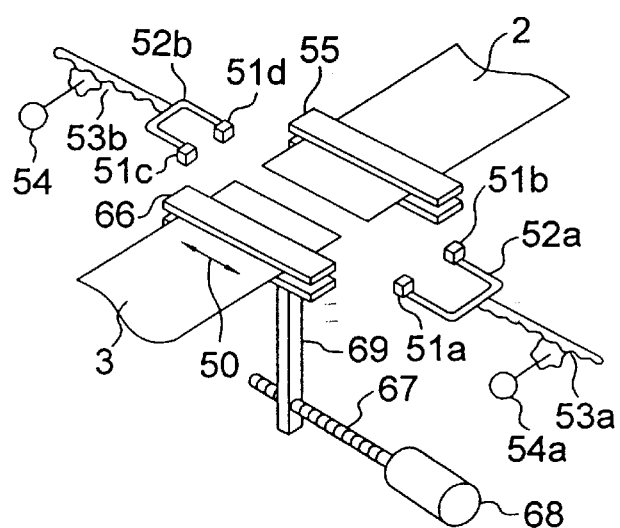
FIG. 10 is a schematic view of a conventional apparatus.
Figure 11:
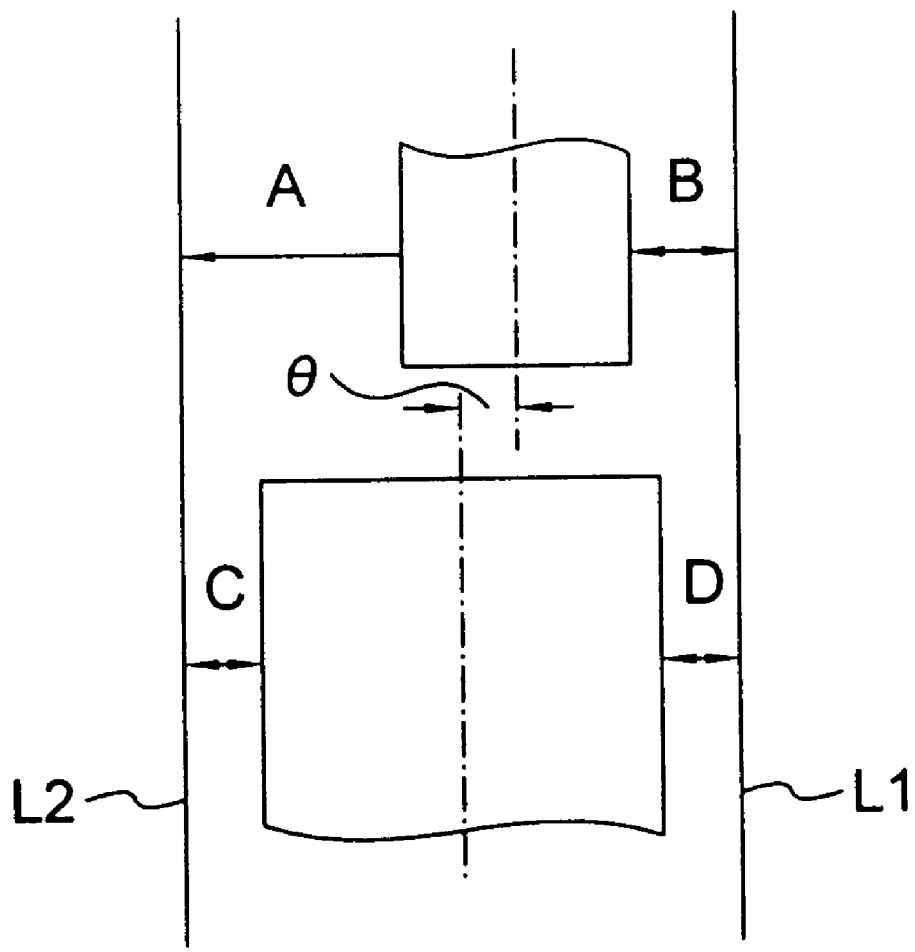
FIG. 11 is an explanatory view of a detection method used in the conventional apparatus.

Next, as shown in FIG. 9, the movable frame 1 is moved toward the non-operation side (i.e. in the left handed direction in the drawing). This motion or travel makes it possible to obtain the absolute positions of the operation side plate side edges of the anterior plate 2 and the posterior plate 3 using the operation side (right handed side of the drawing) plate side edge detectors 12 and 10 (13 and 11) similarly to the first embodiment. Therefore, the travelling distance or amount in this left handed direction can be suppressed to be such a range as to obtain the absolute positions of the operation side plate side edges.

In this manner, by reciplocatingly moving the movable frame 1 forwardly and rearwardly in the traveling direction thereof within the small traveling distance, it is also possible to detect the absolute positions of the widthwise plate side edges of the anterior plate 2 and the posterior plate 3, and obtain the absolute positions of the plate width centers of the anterior plate 2 and the posterior plate 3 for a short time period, as similarly to the aforementioned embodiments. Therefore, through the calculation of the deviation amount between the plate width centers of the plates, it is possible to quickly perform the plate width center alignment correcting the deviation amount finally.

To detect the widthwise plate side edges of the two cut plates 2 and 3 using the plate side edge detectors disposed on the movable frame 1 or the cutting means supported by the movable frame 1 and elongated in the width direction of the web, the first, second to fifth embodiments employ an arrangement in which the movable frame 1 is moved to detect the plate width of the two cut plates by moving the movable frame after the web is cut and before the two cut plates are welded, and then the plate width center alignment are effected for the two cut plates. The method in the sixth embodiment can function by slightly moving the movable frame 1 within a range in which the plate side edges can be detected, and thus the quick plate width center alignment can be attained.

According to the present invention, since it is unnecessary to install the detection driving device for moving the plate side edge detectors for detection, and since it is sufficient to combine the detectors relatively simple in construction with available movable frame, the entire construction of the welding machine can be made simple in construction, and small in size. Therefore, the maintenance is made relatively easy.

According to the present invention, since the plate widths of the anterior from the posterior plate can be detected with high accuracy from the position closest to the cutting-welding position, it is possible to effect the accurate plate width center alignment. That is, the nation is made more reliable to provide high-accurate detected value on the basis of which the accurate plate width center alignment can be performed.

According to the present invention, since it is unnecessary for the sequence of the welding machine to perform the detection motion of the plate side edge detectors, i.e. the drive control of the detection driving means, the entire operation time period of the welding machine can be shortened.

What is claimed is:

1. A plate width center alignment apparatus for a welding machine having a movable frame comprising a cutting means for cutting a web in a width direction, and a welding means for welding portions of two plates cut from the web, wherein the movable frame is movable in the width direction of the web and the cutting and welding are performed while the movable frame is moved in the width direction, the plate width center alignment apparatus comprising:

a plate width center alignment means for detecting a plate width of each of the two cut plates and aligning plate width centers of the two cut plates with each other, the plate width center alignment means comprising a plurality of plate side edge detectors which detect widthwise plate side edges of the two cut plates, and which are disposed on the movable frame.

2. A plate width center alignment apparatus for a welding machine having a movable frame comprising a cutting means for cutting a web in a width direction, and a welding means for welding portions of two plates cut from the web, wherein the movable frame is movable in the width direction of the web and the cutting and welding are performed while the movable frame is moved in the width direction, the plate width center alignment apparatus comprising:

plate width center alignment means for detecting plate width of the two cut plates and aligning plate width centers with each other, the plate width center alignment means comprises a plurality of plate side edge detectors which detect widthwise plate side edges of the two cut plates, and which are disposed on the cutting means supported by the movable frame and elongated in the width direction of the web.

3. The plate width center alignment apparatus for the welding machine as set forth in claim 1, wherein said plate side edge detectors detect a maximum width and a minimum width of the two cut plates and are disposed on the movable frame to detect the widthwise plate side edges of the cut plates.

4. The plate width center alignment apparatus for the welding machine as set forth in claim 2, wherein the plate side edge detectors detect a maximum width and a minimum width of the two cut plates and are disposed on the cutting means supported by the movable frame and elongated in the width direction of the web to detect the widthwise plate side edges of the cut plates.

5. The plate width center alignment apparatus for the welding machine as set forth in claim 1, wherein each of the plate side edge detectors comprises swinging means for swinging each of the plate side edge detectors to detect a corresponding one of the widthwise plate side edges of the webs.

6. The plate width center alignment apparatus for the welding machine as set forth in claim 1, wherein the plate side edge detectors comprise optical sensors arranged in parallel to detect the plate side edges in association with the motion of the movable frame.

7. The plate width center alignment apparatus for the welding machine as set forth in claim 1, further comprising a moving means upon which the plate side edge detectors are mounted, and which is disposed on both sides in the width direction of the web to be movable in the width direction of the web.

8. A plate width center alignment method used in the plate width center alignment apparatus for the welding machine as set forth in claim 1, the method comprising the steps of:

detecting the plate widths of the two cut plates by moving the movable frame after the web is cut and before the two cut plates are welded to each other; and aligning the centers of the plate widths of the two cut plates with each other based on the detection result.

\* \* \* \* \*